United States Patent
Owens et al.

(10) Patent No.: US 7,784,732 B2
(45) Date of Patent: Aug. 31, 2010

(54) BOUNDARY-LAYER-INGESTING INLET FLOW CONTROL SYSTEM

(75) Inventors: Lewis R. Owens, Williamsburg, VA (US); Brian G. Allan, Williamsburg, VA (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 495 days.

(21) Appl. No.: 11/958,673

(22) Filed: Dec. 18, 2007

(65) Prior Publication Data

US 2008/0164378 A1 Jul. 10, 2008

Related U.S. Application Data

(60) Provisional application No. 60/883,396, filed on Jan. 4, 2007.

(51) Int. Cl.
*B64B 1/24* (2006.01)
(52) U.S. Cl. ............... 244/53 B; 137/15.2; 137/15.1; 60/751; 244/204.1
(58) Field of Classification Search ............... 244/53 B, 244/207, 204, 204.1; 137/15.2, 15.1; 60/262, 60/797, 751
See application file for complete search history.

(56) References Cited

U.S. PATENT DOCUMENTS

| | | | |
|---|---|---|---|
| 3,666,211 A | 5/1972 | Cathers et al. | |
| 3,807,665 A | 4/1974 | Coombe | |
| 4,696,442 A * | 9/1987 | Mazzitelli | 244/53 B |
| 4,989,807 A * | 2/1991 | Foreman et al. | 244/53 B |
| 5,447,283 A * | 9/1995 | Tindell | 244/207 |
| 5,779,196 A | 7/1998 | Timar | |
| 6,129,309 A * | 10/2000 | Smith et al. | 244/53 B |
| 6,193,191 B1 | 2/2001 | Falcimaigne et al. | |
| 6,349,899 B1 | 2/2002 | Ralston | |
| 6,371,414 B1 | 4/2002 | Truax et al. | |
| 6,622,973 B2 | 9/2003 | Al-Garni et al. | |
| 6,634,595 B2 | 10/2003 | Koncsek et al. | |
| 6,655,632 B1 * | 12/2003 | Gupta et al. | 244/53 B |
| 6,682,021 B1 | 1/2004 | Truax et al. | |
| 6,763,651 B2 * | 7/2004 | Shmilovich et al. | 60/39.092 |
| 6,938,854 B2 * | 9/2005 | Nelson | 244/120 |
| 6,945,494 B2 | 9/2005 | Bagnall | |
| 2002/0134886 A1* | 9/2002 | Seidel | 244/53 B |
| 2005/0274103 A1* | 12/2005 | Prasad et al. | 60/226.1 |
| 2010/0044522 A1* | 2/2010 | Siercke et al. | 244/53 B |

* cited by examiner

*Primary Examiner*—J. Woodrow Eldred
(74) *Attorney, Agent, or Firm*—Helen M. Galus

(57) ABSTRACT

A system for reducing distortion at the aerodynamic interface plane of a boundary-layer-ingesting inlet using a combination of active and passive flow control devices is disclosed. Active flow control jets and vortex generating vanes are used in combination to reduce distortion across a range of inlet operating conditions. Together, the vortex generating vanes can reduce most of the inlet distortion and the active flow control jets can be used at a significantly reduced control jet mass flow rate to make sure the inlet distortion stays low as the inlet mass flow rate varies. Overall inlet distortion, measured and described as average SAE circumferential distortion descriptor, was maintained at a value of 0.02 or less. Advantageous arrangements and orientations of the active flow control jets and the vortex generating vanes were developed using computational fluid dynamics simulations and wind tunnel experimentations.

20 Claims, 4 Drawing Sheets

BOUNDARY-LAYER-INGESTING INLET FLOW CONTROL SYSTEM

ORIGIN OF THE INVENTION

The invention described herein was made by employees of the United States Government and may be manufactured and used by or for the Government for Government purposes without payment of any royalties thereon or therefore.

This application claims the benefit of U.S. Provisional Patent Application No. 60/883,396, filed Jan. 4, 2007, which is hereby incorporated by reference in its entirety.

BACKGROUND OF THE INVENTION

The present invention relates to boundary-layer-ingesting inlets for aircraft engines and more specifically a system for reducing distortion at the aerodynamic interface plane using a combination of active and passive flow control devices.

The effect of aviation on the environment and in particular global warming has recently become a focus of study. This study considers the three primary impacts that civil aviation has on the environment. These impacts include aircraft noise and emissions pollution around airports and emissions at altitude. In response to environmental concerns and to foster revolutionary propulsion technologies the feasibility of the Blended-Wing-Body (BWB) concept as an efficient alternative to conventional transport configurations was explored. The BWB concept has been considered in various forms for several years. System studies have shown that in order to make the largest impact on the vehicle performance, the engines and inlets should be placed near the upper surface on the aft section of the vehicle. However, the incorporation of the inlets on the surface of the vehicle increases the technical risk of the configuration. While preliminary designs have avoided this risk by positioning the engines on pods the use of boundary-layer-ingesting (BLI) flush-mounted, offset inlets, will increase our understanding of the technical risk and benefits of this type of inlet design and how to best mitigate them using flow control. Additional system studies continue to indicate the advantages of BLI inlets for the BWB configuration including less fuel burn and lower noise characteristics.

When the engines are positioned near the surface, the BWB engine inlet will likely be an S-shaped duct with the capability to ingest the large boundary layer generated over the aircraft body. The inlet must perform this task while also meeting standard inlet distortion and pressure recovery performance requirements. Since the boundary layer on the BWB is expected to be on the order of about 30% of the inlet height, this presents a challenging task for inlet design. In addition, the performance assessment of such a highly-integrated propulsion system is a complex undertaking, requiring the simultaneous examination of many influential factors in order to determine whether BLI provides a benefit from a system standpoint. The trade-offs among reduced drag, weight savings or penalty, and engine operation must all be considered to assess the relative benefit of BLI technology. However, in order for the engine to operate in the BLI environment, a minimum distortion level must be achieved even at the cost of reduced efficiency. The effect of BLI on engine performance is known to be detrimental because BLI increases the distortion and reduces the pressure recovery at the engine fan-face. Despite the loss in engine performance, the benefit of BLI must be addressed from an overall systems level viewpoint.

This requirement for at least a minimum level of inlet performance under the severe conditions of an S-duct and a very large onset boundary layer flow have led to the consideration of flow control devices in the inlet to control the flow in this type of configuration. Passive flow control in the form of vortex generating (MG) vanes can be used to improve the inlet flow. A drawback of vortex generating vanes or other forms of passive flow control devices is that they are generally optimized around a small envelope and thus become less effective when the inlet conditions are outside of that envelope. Other drawbacks for passive flow control include increased losses of the inlet flow since passive devices extract energy from the flow for control.

Additionally, active flow control methods, such as active flow control jets, have also been investigated as a means to improve inlet flow for aggressive serpentine inlets with minimal BLI. Active flow control devices have an advantage over passive flow control devices in that the strength of the actuators can be varied as needed. Unlike passive flow control devices, active flow control devices can be adjusted to minimize the inlet distortion over the entire operation of the inlet. Known drawbacks of active flow control include the losses to engine efficiency due to the amount of inlet mass flow required to drive the flow control and the added complexity of plumbing and operating the active flow control.

One type of active flow control device is disclosed in U.S. Pat. No. 6,371,414, issued to Truax et al (Truax). In Truax, flow behavior of a ducted flow is controlled using very-small-scale effectors. These effectors are based on micro-fabricated-electro-mechanical system (MEMS) technology to sense flow conditions and activate the very-small-scale effectors. The very-small-scale-effectors can be fluidic effectors for creating; a secondary flow, pulsing effectors, synthetic flow effectors, micro-bubble effectors. The very-small-scale effectors are used to induce and manipulate vortex formation to control the lateral layer separation within the fluid flow.

However, there remains a need for additional methods and apparatus to improve BLI inlet flow across the range of flow conditions while minimizing the negative impacts of active flow control.

SUMMARY OF THE INVENTION

In view of the deficiencies described above, it is an object of the present invention to provide a BLI inlet flow control system for reducing aerodynamic interface distortion across the range of inlet flow conditions while minimizing the negative impacts of active flow control.

According to at least one embodiment of the present invention, two types of flow control devices were used to manipulate the flow inside the inlet diffuser of a BLI inlet. The two devices were active flow control jets and vortex generating vanes. A preferred arrangement of the active flow control jets and the vortex generating vanes was developed with the aid of computational fluid dynamics simulations.

In an advantageous illustrative embodiment relative to a model approximately 2.5% scale, jets of air were oriented in such a way to blow outward away from the duct centerline. The air jets were arranged in a plane substantially perpendicular to the duct center line and pointed upward from the duct surface (about 30 degrees) so that the jet penetrates into the flow. The vortex generating vanes located on the bottom surface of the inlet had a vane chord length of about 15% of the diameter of the aerodynamic interface plane, a vane height of about 7.4% of the aerodynamic interface plane diameter, and were oriented at about a 12.9 degree angle to a free stream flow direction. The vortex generating vanes located on the side surface of the inlet had a vane chord length of about 15% of the diameter of the aerodynamic interface plane, a vane height of about 6.5% of the aerodynamic interface plane diameter, and were oriented at about a 11.5 degree angle to a free stream flow direction.

The reason for combining these two types of flow control devices was to balance the strength and weaknesses of each device. The active flow control jets require a significant amount of mass flow rate to effectively reduce the inlet distortion, but do not depend on the velocity of the onset flow to create a flow deflection force and can vary their strength by increasing or decreasing the mass flow rate of the jet. The vortex generating vanes do not require any external supply of mass flow rate to effectively reduce the inlet distortion, but do depend on the onset flow velocity to create a flow deflection force. Together, the vortex generating vanes can reduce most of the inlet distortion and the active flow control jets can be utilized at significantly reduced control jet mass flow rates. The hybrid jet/VG flow control system can operate effectively over a larger operation range by varying the amount of jet mass flow to keep the distortion in acceptable range.

Other features and advantages of the invention will be apparent from the following detailed description taken in conjunction with the following figures, wherein like reference numerals represent like features.

DETAILED DESCRIPTION OF THE INVENTION

Figure 1:
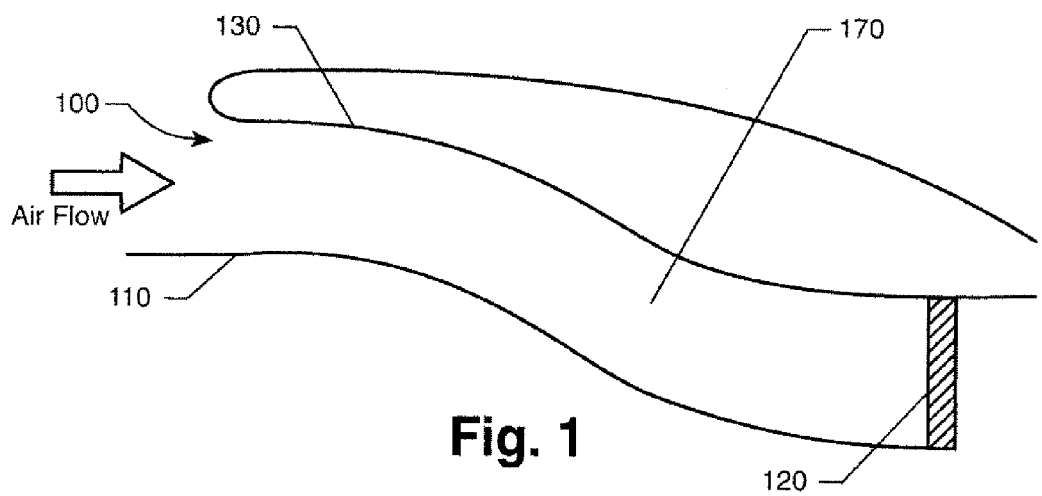
FIG. 1 shows a side view cross section of a boundary-layer-ingesting inlet as used in the present invention.

While this invention is susceptible of embodiments in many different forms, there are shown in the drawings and will herein be described in detail, preferred embodiments of the invention with the understanding that the present disclosure is to be considered as an exemplification of the principles of the invention and is not intended to limit the broad aspect of the invention to the embodiments illustrated.

FIG. 1 shows a side view cross section of a boundary-layer-ingesting inlet as used in the present invention. As shown, the BLI inlet 100 is described as generally having a serpentine or "S" shape which leads to the aircraft engine. The front face of the engine can be referred to as the aerodynamic interface plane (AIP) 120.

Distortion across the AIP, both radially and circumferentially, can greatly affect engine performance. Preferably, circumferential distortion, measured and described using the average SAE circumferential distortion descriptor, $DPCP_{avg}$ has a value of 0.02 or less. The BLI inlet 100 has a top surface 130 and a bottom surface 1110. The top surface 130 blends to the bottom surface 110 via a side surface 140 region. These surfaces are or can be nearly continuous and their descriptions herein are for illustrative purposes.

Figure 2:
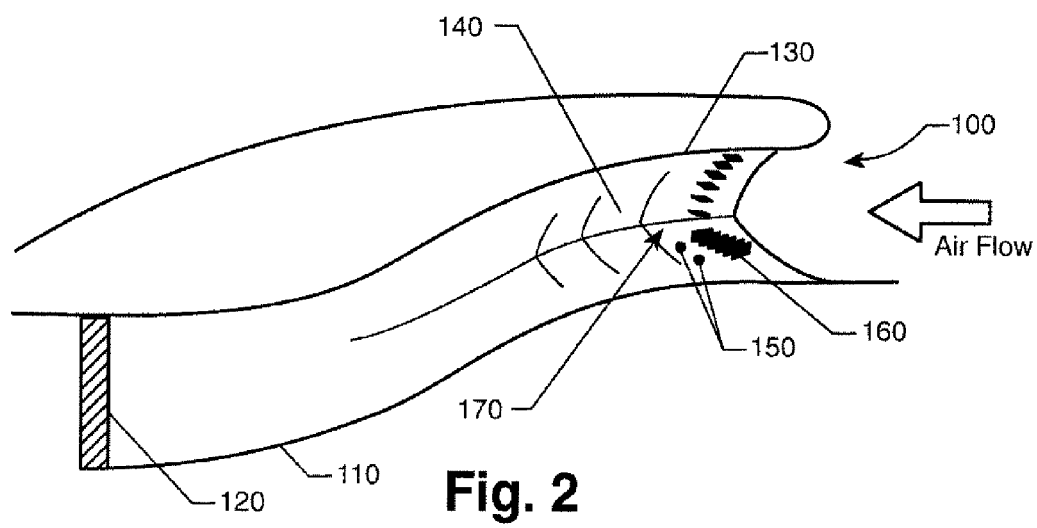
FIG. 2 shows in perspective a side view cross section of a boundary-layer-ingesting inlet as used in the present invention having vortex generating vanes and active flow control air jets disposed therein according to the present invention.

In the present invention, two types of flow control devices can be used to manipulate the flow inside the inlet diffuser 170. FIG. 2 shows in perspective a side view cross section of a boundary-layer-ingesting inlet as used in the present invention having vortex generating vanes and active flow control air jets disposed therein according to the present invention. The two devices were active flow control jets 150 and vortex generating vanes 160. One advantageous arrangement of the active flow control jets 150 and the vortex generating vanes is shown in FIG. 2. Computational fluid dynamics (CFD) simulations, as known in the art, can be used to guide the selection of the active flow control jet 150 locations as well as the vortex generating vanes 160.

Figure 3:
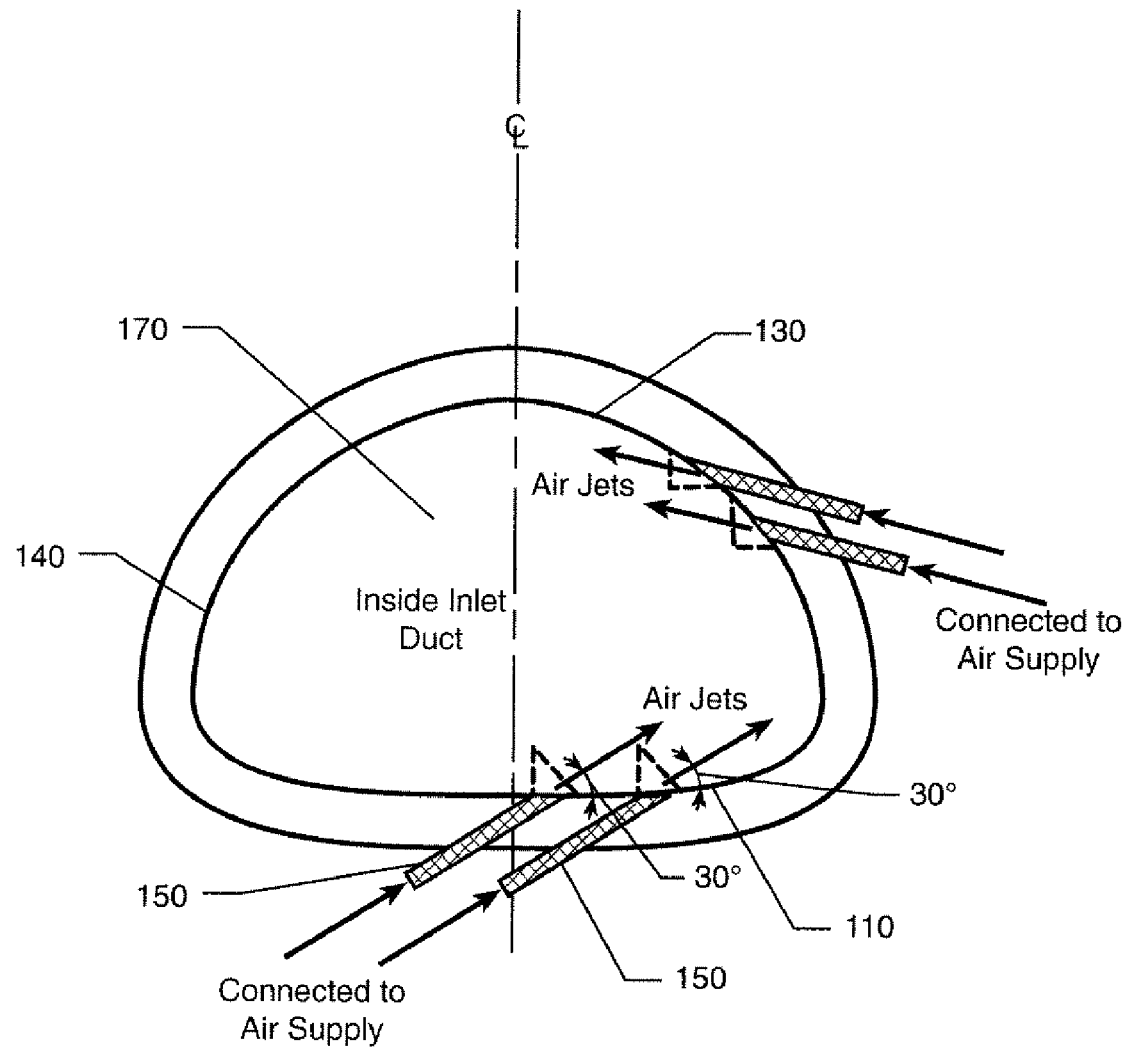
FIG. 3 shows a sectional view of a boundary-layer-ingesting inlet as used in the present invention and the orientation of the active flow control air jets disposed therein according to the present invention.

FIG. 3 shows a sectional view of a boundary-layer-ingesting inlet as used in the present invention and the orientation of the active flow control air jets disposed therein according to the present invention. As shown, the active flow control jets 150 were skewed 90° to the oncoming flow, that is, they were in line with the cross-sectional plane as shown in FIG. 3. Advantageously, in regard to a model approximately 2.5% scale, the active flow control jets 150 were oriented with a 30° upward pitch local surface tangent of the inlet bottom surface 110. The active flow control jets 150 shown in FIG. 3 generate a sideways deflection of the oncoming flow. The extensions 150a of the air jets outside of the duct cross section are intended to show a tubing connection to a higher-pressure air supply (not shown). These air jet tubes connected to the supply could utilize a programmable in-line control valve to regulate the air jet mass flow rate, in a manner known in the art. Upon opening these control valves, the pressurized air would vent into the duct creating the jets of air to manipulate the flow inside the duct. Note that in FIG. 3, the active flow control jets 150 are shown only on the bottom surface 10 and one side 140 of the inlet 100 for illustrative purposes. During testing of this embodiment, the active flow control jets 150 were mirrored about the centerline of the inlet 100. This approach was taken to counter the secondary inlet flow that is produced by the higher pressure at the top of the diffuser 170 than at the bottom, which tends to cause low momentum boundary layer flow to pool in the bottom of the diffuser 170. So, the active flow control jets 150 were oriented to primarily impart momentum to produce a side force on the local flow and secondly to create vorticity.

Other active flow control jet 150 configurations may also be used as desired or needed. These other configurations can include variations in the numbers, locations, orientation, and operation range of the active flow control jets 150. While developing the present invention, the active flow control jets 150 were used in various configurations with and without vortex generating vanes 160. The publication, Owens, L. R., Allan, B. G., and Gorton, S. A., "Boundary-Layer-Ingesting Inlet Flow Control," AIAA 2006-0839, gives an overview of one such study, and it is hereby incorporated by reference as if set forth in its entirety. In tested models, configurations without vanes, the active flow control jets 150 were operated in a range of up to 2.5% of inlet mass flow rate. This relatively high level of active flow control jet 150 air was needed to reduce distortion to levels within the distortion goal of 0.02. In various applications, the active flow control jets 150 can be operated with varying amounts across the operational range of the inlet 100 to achieve a desired level of distortion.

Figure 4:
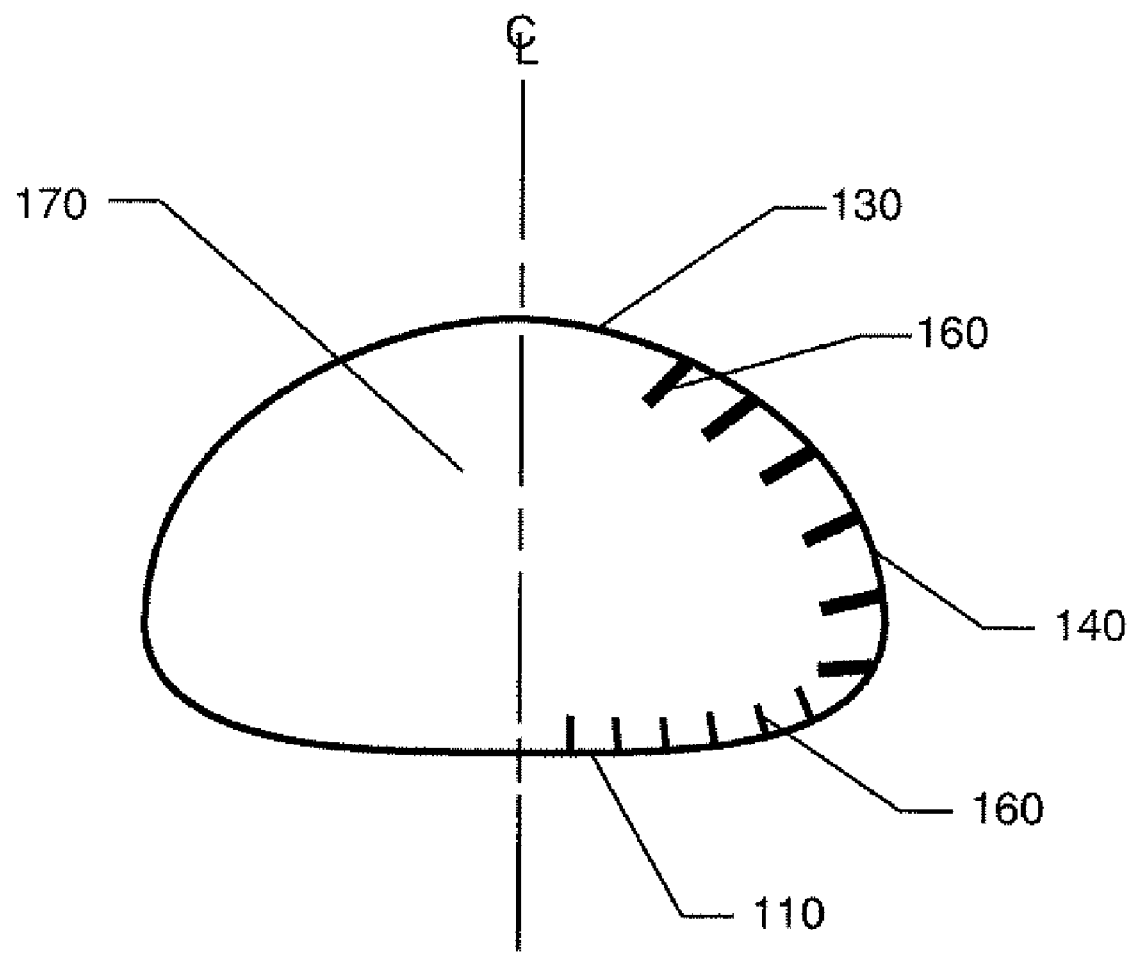
FIG. 4 shows a sectional view of a boundary-layer-ingesting inlet as used in the present invention and the orientation of the vortex generating vanes disposed therein according to the present invention.

FIG. 4 shows a sectional view of a boundary-layer-ingesting inlet as used in the present invention and the general orientation of the vortex generating vanes disposed therein according to the present invention. Note that in FIG. 4, the vortex generating vanes 160 are shown only on one side of the inlet 100 for illustrative purposes. During testing, the vortex generating vanes 160 were mirrored about the centerline of the inlet 100. The layout of the vortex generating vanes 160 was obtained from a design-of-experiments CFD analysis at a given inlet 100 flow condition. In one exemplary embodiment, again relative to a model of approximately 2.5% scale, vortex generating vanes 160 located on the bottom surface 110 of the inlet 100 had a vane 160 chord length of about 15% of the diameter of the aerodynamic interface plane 120, a vane 160 height of about 7.4% of the aerodynamic interface plane 120 diameter, and were oriented at about a 12.9 degree angle to a free stream flow direction. Vortex generating vanes 160 located on the side surface 140 of the inlet 100 had a vane 160 chord length of about 15% of the diameter of the aerodynamic interface plane 120, a vane 160 height of about 6.5% of the aerodynamic interface plane 120 diameter, and were oriented at about a 11.5 degree angle to a free stream flow direction. Other vane 160 configurations, including, but not limited to, multiple rows of vanes 160, may also be used to reduce the required vane heights. Furthermore, in various applications, the number, location, dimensions, and orientation of the vanes 160 may be customized to the particular application as needed. The number, shape, location, and orientation of the vanes can also be influenced by other operational requirements, including, but not limited to, maintenance, survivability, and observability.

Figure 5:
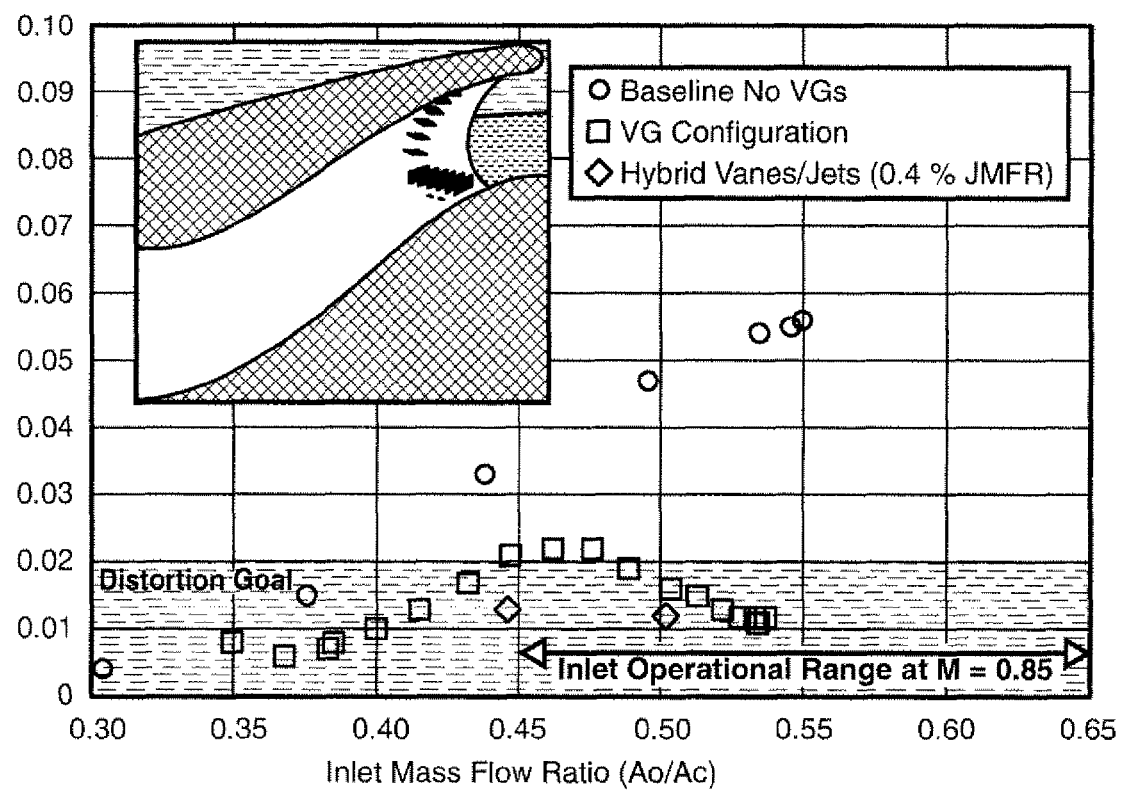
FIG. 5 is a graph showing a reduction in distortion at the aerodynamic interface plane using a combination of vortex generating vanes and flow control jets.

The effects of vortex generating vanes 160 and vortex generating vanes 160 in combination with air control flow Jets 150 on distortion is shown in FIG. 5. FIG. 5 is a graph of wind tunnel test results showing a reduction in distortion at the aerodynamic interface plane using a combination of vortex generating vanes and flow control jets in an inlet model. In FIG. 5, distortion at that aerodynamic interface plane 120 is shown in the vertical axis and inlet mass flow ratio is shown in the horizontal axis. Inlet mass flow ratio is defined as the ratio of the actual mass airflow into the inlet 100 divided by the ideal mass airflow capture. FIG. 5 shows that without any flow control devices distortion is well above the 0.02 goal for most test conditions, particularly those areas corresponding to the inlet 100 operation range (shown as an inlet mass flow ratio of 0.45 to 0.65). For these conditions the distortion ranges from above 0.03 to at least 0.55.

FIG. 5 demonstrates that the addition of vortex generating vanes 160 significantly reduces the distortion. The vortex generator vanes 160 reduced the circumferential distortion from 0.055 to 0.010 near the inlet 100 mass flow design point of about 0.55. Lower inlet 100 mass flow settings of 0.45 to about 0.50 with the vane 160 alone configuration, produced higher distortion levels, which exceed the 0.02 maximum distortion level. However, using a hybrid vane/jet flow control configuration maintained the distortion at acceptable levels as the inlet mass flow ratio decreased. These active flow control jets only required about 0.4% of the inlet mass flow to achieve this level of flow control enhancement.

The reason for combining these two types of flow control devices was to balance the strength and weaknesses of each device. The active flow control jets 150 require a significant amount of mass flow rate to effectively reduce the inlet distortion, but do not depend on the velocity of the onset flow to create a flow deflection force. The vortex generating vanes 160 do not require any external supply of mass flow rate to effectively reduce the inlet distortion, but do depend on the onset flow velocity to create a flow deflection force. Together, the vortex generating vanes 160 can reduce most of the inlet distortion and the active flow control jets 150 can be used at a significantly reduced control jet mass flow rate to make sure the inlet distortion stays low as the inlet mass flow rate varies. In various applications, commercial or otherwise, inlet distortion of a desired level can be achieved by the combination of the active flow control jets and the vortex generating vanes.

It should be understood that the foregoing description and examples are only illustrative of the invention. Various alternatives and modifications can be devised by those skilled in the art without departing from the invention. Accordingly, the present invention is intended to embrace all such alternatives, modifications, and variances that fall within the scope of the appended claims.

The invention claimed is:

1. A boundary-layer-ingesting inlet comprising:
   a plurality of vortex generating vanes, and
   a plurality of active flow control jets,
      wherein said plurality of vortex generating vanes and said plurality of active flow control jets operatively achieve inlet distortion of a desired level.

2. The boundary-layer-ingesting inlet according to claim 1, wherein said plurality of active flow control jets operate in the range of 0% to about 0.5% of inlet mass flow.

3. The boundary-layer-ingesting inlet according to claim 1, wherein said plurality of active flow control jets are oriented at an acute angle to a local tangent of an interior surface of said inlet.

4. The boundary-layer-ingesting inlet according to claim 1, wherein said plurality of active flow control jets comprises at least one of:
   one or more active flow control jets located on a bottom surface of said inlet; and
   one or more active flow control jets located on one or more side surfaces of said inlet.

5. The boundary-layer-ingesting inlet according to claim 1, wherein said plurality of vortex generating vanes comprises at least one of:
   a plurality of vortex generating vanes located on a bottom surface of said inlet; and
   a plurality of vortex generating vanes located on one or more side surfaces of said inlet.

6. The boundary-layer-ingesting inlet according to claim 1, wherein said plurality of vortex generating vanes are optimized in number, distribution and size for a given application.

7. The boundary-layer-ingesting inlet according to claim 6, wherein said optimal locations, numbers and sizes were determined using computational fluid dynamics and optimization design tools.

8. The boundary-layer-ingesting inlet according to claim 1, wherein said plurality of active flow control jets are optimized in number, distribution and size for a given application.

9. The boundary-layer-ingesting inlet according to claim 8, wherein said optimal locations, numbers and sizes were determined using computational fluid dynamics and optimization design tools.

10. The boundary layer-ingesting inlet according to claim 1 wherein said plurality of active flow control jets are configured to have a significantly reduced mass flow rate when used in conjunction with said plurality of vortex generating vanes.

11. The boundary layer-ingesting inlet according to claim 3 wherein said acute angle is about 30 degrees.

12. A method of reducing distortion at the aerodynamic interface plane for a boundary-layer-ingesting inlet comprising:
   providing a plurality of vortex generating vanes in said inlet,
   providing a plurality of active flow control jets in said inlet, and utilizing said vanes and at least one of said jets to reduce inlet distortion to a desired level.

13. The method of reducing distortion at the aerodynamic interface plane for a boundary-layer-ingesting inlet according to claim 12, further comprising determining the number, size, orientation and location of said vanes and said jets for optimal performance for a given application.

14. The method of reducing distortion at the aerodynamic interface plane for a boundary-layer-ingesting inlet according to claim 13, wherein said determining the numbed size, orientation and location of said vanes and said jets comprises using computational fluid dynamics and optimization design tools.

15. The method of reducing distortion at the aerodynamic interface plane for a boundary-layer-ingesting inlet according to claim 12, wherein providing a plurality of active flow control jets in said inlet comprises operating said plurality of active flow control jets in the range of about 0% of inlet mass flow to about 0.5% of inlet mass flow.

16. The method of reducing distortion at the aerodynamic interface plane for a boundary-layer-ingesting inlet according to claim 12, wherein providing a plurality of active flow control jets in said inlet comprises orienting said plurality of active flow control Jets at both an acute angle to a local tangent of an interior surface and yaw angle relative to the local flow of said inlet.

17. The method of reducing distortion at the aerodynamic interface plane for a boundary-layer-ingesting inlet according to claim 12, wherein providing a plurality of active flow control jets in said inlet comprises at least one of:
   providing one or more active flow control jets located on a bottom surface of said inlet; and
   providing one or more active flow control jets located on one or more side surfaces of said inlet.

18. The method of reducing distortion at the aerodynamic interface plane for a boundary-layer-ingesting inlet according, to claim 12, wherein providing a plurality of vortex generating vanes in said inlet comprises at least one of:
   providing a plurality of vortex generating vanes located on a bottom surface of said inlet, and
   providing a plurality of vortex generating vanes located one or more side surfaces of said inlet.

19. The method of reducing distortion at the aerodynamic interface plane for a boundary-layer-ingesting inlet according to claim 12 wherein said plurality of active flow control jets are configured to have a significantly reduced mass flow rate when used in conjunction with said plurality of vortex generating vanes.

20. The method of reducing distortion at the aerodynamic interface plane for a boundary-layer-ingesting inlet according to claim 16 wherein said acute angle is about 30 degrees.

* * * * *